(12) United States Patent
Mokhtar et al.

(10) Patent No.: US 12,470,238 B2
(45) Date of Patent: Nov. 11, 2025

(54) SYSTEMS AND METHODS FOR MANAGING RF COEXISTENCE BETWEEN ACCESSORIES

(71) Applicant: Apple Inc., Cupertino, CA (US)

(72) Inventors: Mohammed W Mokhtar, Campbell, CA (US); Alireza Pourghorban Saghati, San Jose, CA (US); Rafik M Dalati, San Jose, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 18/075,116

(22) Filed: Dec. 5, 2022

(65) Prior Publication Data

US 2024/0080054 A1 Mar. 7, 2024

Related U.S. Application Data

(60) Provisional application No. 63/404,055, filed on Sep. 6, 2022.

(51) Int. Cl.
*H04B 1/10* (2006.01)
*H04R 1/10* (2006.01)

(52) U.S. Cl.
CPC .................. *H04B 1/1027* (2013.01)

(58) Field of Classification Search
CPC .......... H04B 1/10; H04B 1/1027; H04B 1/16; H04B 5/00; H04B 5/20; H04B 5/22; H04B 5/24; H04R 1/10; H04R 1/1033
See application file for complete search history.

(56) References Cited

U.S. PATENT DOCUMENTS

| | | | |
|---|---|---|---|
| 9,148,717 B2 | 9/2015 | Shaffer | |
| 9,502,913 B2 | 11/2016 | Castillo | |
| 9,854,344 B2 | 12/2017 | Cheney | |
| 10,110,280 B2 * | 10/2018 | Nakano | H04B 5/79 |
| 10,389,176 B2 * | 8/2019 | Fukaya | H04B 5/24 |
| 10,446,912 B2 * | 10/2019 | Choi | H01Q 1/243 |
| 10,840,964 B2 * | 11/2020 | Mizunuma | H04B 5/22 |

(Continued)

FOREIGN PATENT DOCUMENTS

| KR | 20130043109 A | 4/2013 |
|---|---|---|
| WO | 2014121305 A2 | 8/2014 |

OTHER PUBLICATIONS

KR20130043109A, "Method and Apparatus for Managing Interference in a Communication Device", Manssen et al., Apr. 29, 2013, (English Text). (Year: 2013).*

(Continued)

*Primary Examiner* — Quochien B Vuong
(74) *Attorney, Agent, or Firm* — FLETCHER YODER PC

(57) ABSTRACT

To more accurately determine whether a first electronic device is disposed in a second electronic device, which may be an enclosure for the first electronic device, the first electronic device may determine Voltage Standing Wave Ratio (VSWR) values at its transceiver, and determine whether it is moving and/or disposed in the second electronic device based on the VSWR values. If the first electronic device determines that it is disposed in the second electronic device, then the first electronic device may perform radio frequency coexistence actions, such as backing off (e.g., reducing) radio power or deactivating its radio to avoid radio frequency coexistence issues with the second electronic device.

20 Claims, 5 Drawing Sheets

(56) References Cited

U.S. PATENT DOCUMENTS

| | | |
|---|---|---|
| 10,942,701 B2 | 3/2021 | Boesen |
| 11,197,142 B1 | 12/2021 | Kontopidis |
| 2011/0254637 A1 | 10/2011 | Manssen et al. |
| 2014/0213210 A1 | 7/2014 | Li et al. |
| 2021/0133399 A1 | 5/2021 | Coelho De Souza |
| 2021/0208652 A1 | 7/2021 | Knoppert |

OTHER PUBLICATIONS

First Examination Report for Indian Patent Application No. 202314057884 dated Sep. 12, 2024; 6 pgs.

* cited by examiner

SYSTEMS AND METHODS FOR MANAGING RF COEXISTENCE BETWEEN ACCESSORIES

CROSS-REFERENCE TO RELATED APPLICATIONS

This application claims priority to U.S. Provisional Application No. 63/404,055, filed Sep. 6, 2022, entitled "SYSTEMS AND METHODS FOR MANAGING RF COEXISTENCE BETWEEN ACCESSORIES," the disclosure of which is incorporated by reference herein in its entirety for all purposes.

BACKGROUND

The present disclosure relates generally to wireless communication, and more specifically to coexistence between radios of accessory devices.

When multiple radios of multiple electronic (e.g., accessory) devices operate concurrently and/or in proximity in one another, emissions by the radios may aggregate to exceed emission regulations, cause receiver saturation or desense of the radios, or cause other issues that may negatively impact user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving, via processing circuitry of an electronic device, an indication that the electronic device is moving; receiving, via the processing circuitry, a Voltage Standing Wave Ratio (VSWR) value for one or more antennas of the electronic device; and performing, via the processing circuitry, a radio frequency coexistence action based on the VSWR value.

In another embodiment, an electronic device includes one or more antennas, a transceiver coupled to the one or more antennas, and processing circuitry coupled to the transceiver. The processing circuitry is configured to receive an indication that the electronic device is not in use, receive a Voltage Standing Wave Ratio (VSWR) value for the one or more antennas, and perform a radio frequency coexistence action based on the VSWR value.

In yet another embodiment, one or more non-transitory, tangible, computer-readable media stores instructions that cause processing circuitry of a first electronic device to receive, via a transceiver of the first electronic device, an indication of a status of a second electronic device; receive a Voltage Standing Wave Ratio (VSWR) value for one or more antennas of the first electronic device coupled to the transceiver based on the status; and perform a radio frequency coexistence action based on the VSWR value.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
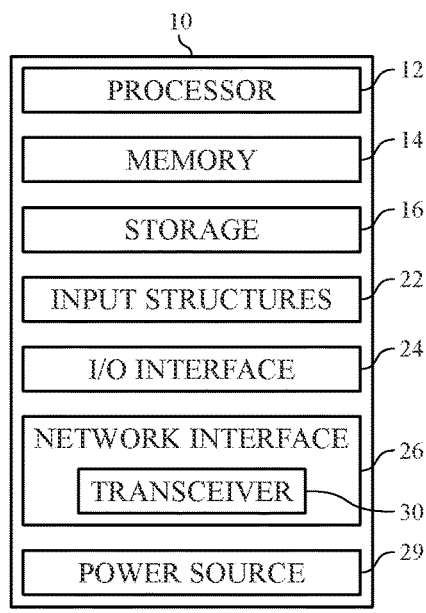
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially"

should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to managing radio frequency coexistence between electronic devices, such as accessory devices (e.g., wearable devices, including earbuds, headphones, enclosure devices for the wearable devices, and so on). In particular, more and more electronic devices are including radio frequency transceivers (e.g., radios). The radios may transmit and/or receive radio frequency signals of different radio frequencies. For example, earbuds may include radios (e.g., a personal area network (PAN) radios, such as Bluetooth® radios), and an enclosure of the earbuds may also include a radio. However, concurrent or simultaneous operation of the radios may cause coexistence issues. In some implementations, communication systems may simply deactivate the radios of the earbuds and/or the enclosure when the devices are within a certain proximity of one another. This is because the radios operating concurrently may result in coexistence issues, such as regulatory emissions violations, receiver saturation and desense on either radio, and so on.

Embodiments herein provide various systems, apparatuses, and techniques to determine whether to back-off (e.g., reduce) power of one or more radios of a first electronic device (e.g., earbuds) or perform other coexistence mitigation procedures based on determining that the first electronic device is disposed in a second electronic device (e.g., an enclosure). In particular, the power back-off may be performed to avoid coexistence issues (e.g., when signals transmitted and/or received by the radios of the electronic devices may violate emission regulations or interfere with one another), such as when the first electronic device is disposed in the second electronic device. As such, in certain scenarios, such as when the first electronic device is in use (e.g., disposed in a user's ears) or when the first electronic device is charging in the second electronic device, it may not need to be determined whether to back-off power of the one or more radios of the first electronic device. That is, when the first electronic device is in use, it may be unnecessary to determine whether to back-off power of the one or more radios of the first electronic device, as it is clear that the first electronic device is not disposed in the second electronic device, and thus there may not be any coexistence issues. Additionally, when the first electronic device receives an indication of being charged (e.g., by the second electronic device), the one or more radios of the first electronic device may be deactivated, so it is unnecessary to determine whether to back-off power of the one or more radios of the first electronic device as there may not be a coexistence issue.

However, there may be instances in which the first electronic device is disposed in the second electronic device, but does not receive an indication of being charged or receives a delayed indication. For example, when a power source (e.g., a battery) of the first electronic device is drained or has a state of charge under a threshold level, there may be a delay between when the second electronic device begins charging the first electronic device, and when the first electronic device receives an indication of charging. Indeed, the first electronic device may receive an indication that charging occurs through its firmware. However, a power management unit of the first electronic device may provide the indication to the firmware, and may only do so when certain capacitors of the first electronic device are charged (e.g., beyond a threshold level). If the power source of the first electronic device is sufficiently drained, then it may only receive the indication of charging through its firmware after the capacitors are charged, and then, only after the charged capacitors activate the power management unit that sends the indication to the firmware.

As such, in some embodiments, processing circuitry of the first electronic device may more reliably or quickly determine whether the first electronic device is disposed in or being charged by the second electronic device based on Voltage Standing Wave Ratio (VSWR) data. If so, then the disclosed embodiments may include backing off power or deactivating the one or more radios of the first electronic device. In particular, the processing circuitry may determine VSWR values or measurements for one or more antennas coupled to a transceiver or transmitter of the first electronic device in a variety of configurations (e.g., during a calibration process). That is, the first electronic device may include a VSWR sensor having a feedback receiver and a bidirectional coupler. A transmitter of the first electronic device may transmit a known signal and the feedback receiver may receive or measure the feedback and determine the VSWR value based on a frequency response reflected back from an antenna of the first electronic device. For example, the VSWR values may be taken while the first electronic device is in a charging configuration (e.g., disposed in the second electronic device), while the first electronic device is being held by a user (e.g., in a hand or hands of the user), while the first electronic device is in an operational configuration (e.g., in an ear or ears of the user, outputting audio signals), and so on). These VSWR values may then be used to compare current VSWR values of the first electronic device to determine whether they are disposed in the second electronic device or charging (e.g., in a predetermined position relative to the second electronic device). For example, if the current VSWR values are within a threshold range of the VSWR values associated with a configuration of the first electronic device, then the processing circuitry may determine that the first electronic device is in that configuration. A VSWR sensor may provide the VSWR data more quickly than determining whether the first electronic device is being charged by the second electronic device, as a transceiver of the first electronic device may determine its VSWR value (e.g., without input from the second electronic device), and thus may optimize design of the whole system (e.g., the first and second electronic devices). Advantageously, the disclosed embodiments leverage the deterministic nature of VSWR readings when two devices (e.g., the first and second electronic devices) are designed mechanically together. Thus, stored VSWR values may be calibrated to provide awareness directly to the radio to act on them efficiently.

The processing circuitry may determine whether the first electronic device is in the operational configuration (e.g., in an ear or ears of the user). For example, the processing circuitry may use one or more sensors, such as an optical sensor, an acoustic sensor, or a proximity sensor, of the first electronic device to determine whether the first electronic device is in the operational configuration. If not, then the processing circuitry may determine whether there is an indication that the first electronic device is to be disposed in the second electronic device (e.g., for charging). For example, the second electronic device may include a form of an enclosure or case having a lid. The second electronic device may also include a sensor, such as a magnet sensor, that may determine whether the lid is in an open or closed position. The second electronic device may charge the first electronic device when the first electronic device is disposed in the second electronic device. As such, the second electronic device may be referred to as a charging device. The second electronic device may transmit an indication, via its radio, to the first electronic device whether the lid is in the open position (e.g., in an accepting configuration to accept the first electronic device) or in the closed position (e.g., in a non-accepting configuration indicating it may not accept the first electronic device). An indication that the second electronic device is in the accepting (e.g., the lid is in the open position) may indicate that the first electronic device may be placed into the second electronic device for charging.

If the processing circuitry determines that the second electronic device is in the accepting configuration, then the processing circuitry receives first VSWR data. In particular, the processing circuitry may cause the VSWR sensor to acquire VSWR data at a first, slower frequency or rate. The processing circuitry may then determine whether the first electronic device is moving the second electronic device. For example, if the first VSWR data corresponds to the first electronic device not being in the operational configuration (e.g., not being disposed in a user's ear) or not being disposed in the second electronic device (e.g., is within a threshold range of a VSWR value when the first electronic device was not in the operational configuration or not disposed in the second electronic device taken during, for example, a calibration process), then the processing circuitry may determine that the first electronic device is moving. In additional or alternative embodiments, the first electronic device may also use one or more additional sensors, such as an accelerometer or other motion sensor, acoustic sensor, and so on, to facilitate or confirm that the first electronic device is moving. As an example, the first and second electronic devices may perform an acoustic non-audible test sequence to determine whether the first electronic device is moving (e.g., toward the second electronic device). That is, the second electronic device may include a speaker that emits a series of non-audible (e.g., so as not to hamper user experience), acoustic signals that may be detected by a microphone of the first electronic device. Based on a signal characteristic (e.g., volume, signal strength, or the like) of the series of signals, the first electronic device may determine whether it is moving (e.g., toward the second electronic device). In another example, the first electronic device may and determine whether it is moving based its motion sensor. If the processing circuitry determines that the first electronic device is moving, then this may indicate that the first electronic device may be placed into the second electronic device for charging.

If the processing circuitry determines that it is moving, then the processing circuitry determines whether the first VSWR data indicates that the first electronic device is disposed in the second electronic device (e.g., is within a threshold range of a VSWR value taken when the first electronic device was disposed in the second electronic device during, for example, a calibration process). If the first VSWR data indicates that the first electronic device is disposed in the second electronic device, then the processing circuitry determines whether the first electronic device is within a threshold proximity of the second electronic device, indicating that the first electronic device may be placed in the second electronic device (e.g., for charging). In some embodiments, the processing circuitry may receive or determine the proximity of the first electronic device to the second electronic device from or based on a sensor (e.g., a proximity sensor, optical sensor, motion sensor, and so on) or radio of the first electronic device. In additional or alternative embodiments, microphones of the first electronic device may receive an acoustic non-audible test sequence, and the processing circuitry may determine whether the first electronic device is within the threshold proximity of the second electronic device based on a signal characteristic (e.g., volume, signal strength, or the like) of the acoustic non-audible test sequence. In another example, the first electronic device may determine a location of the second electronic device (e.g., using radiolocation), and determine whether the first electronic device is within a threshold proximity of the second electronic device, as indicated by a motion sensor. In yet another example, a radio frequency signal communication sequence (e.g., a Bluetooth® advertising sequence) between the first electronic device and the second electronic device may be used to determine whether the first electronic device is within a threshold proximity of the second electronic device.

If the processing circuitry determines that first VSWR data indicates that the first electronic device is disposed in the second electronic device, then the processing circuitry receives second VSWR data. In particular, the processing circuitry may cause the VSWR sensor to acquire VSWR data at a second, faster frequency or rate (e.g., compared to the first, slower frequency or rate). The second, faster frequency of the second VSWR data may be used to confirm the first, slower VSWR data and/or that the first electronic device is indeed disposed in the second electronic device. If the second VSWR data indicates that the first electronic device is disposed in the second electronic device (e.g., is within a threshold range of a VSWR value taken when the first electronic device was disposed in the second electronic device during, for example, a calibration process), then the processing circuitry may perform a radio frequency (RF) coexistence action. For example, the processing circuitry may back-off (e.g., reduce) radio power for the first electronic device or perform other coexistence mitigation procedures, and determine whether the first electronic device is charging. As another example, the processing circuitry may deactivate or turn off the radio of the first electronic device. In this manner, emission regulations may be maintained, receiver saturation or desense of the radios may be reduced or prevented, and other issues that may negatively impact user experience may be avoided.

With this in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of Apple AirPods® and/or an Apple Watch® by Apple Inc. of Cupertino, California), accessory devices (e.g., in the form of an enclosure or case for other electronic devices, such as a case for Apple AirPods®) and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
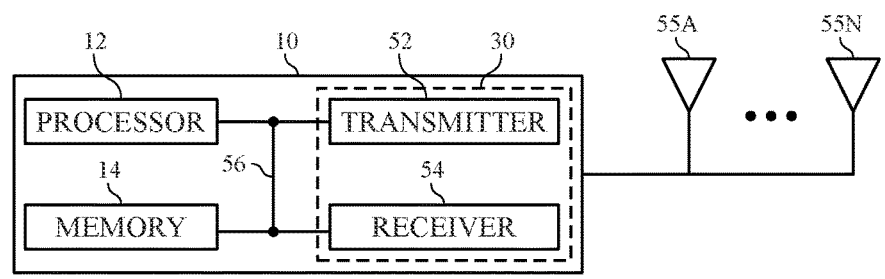
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
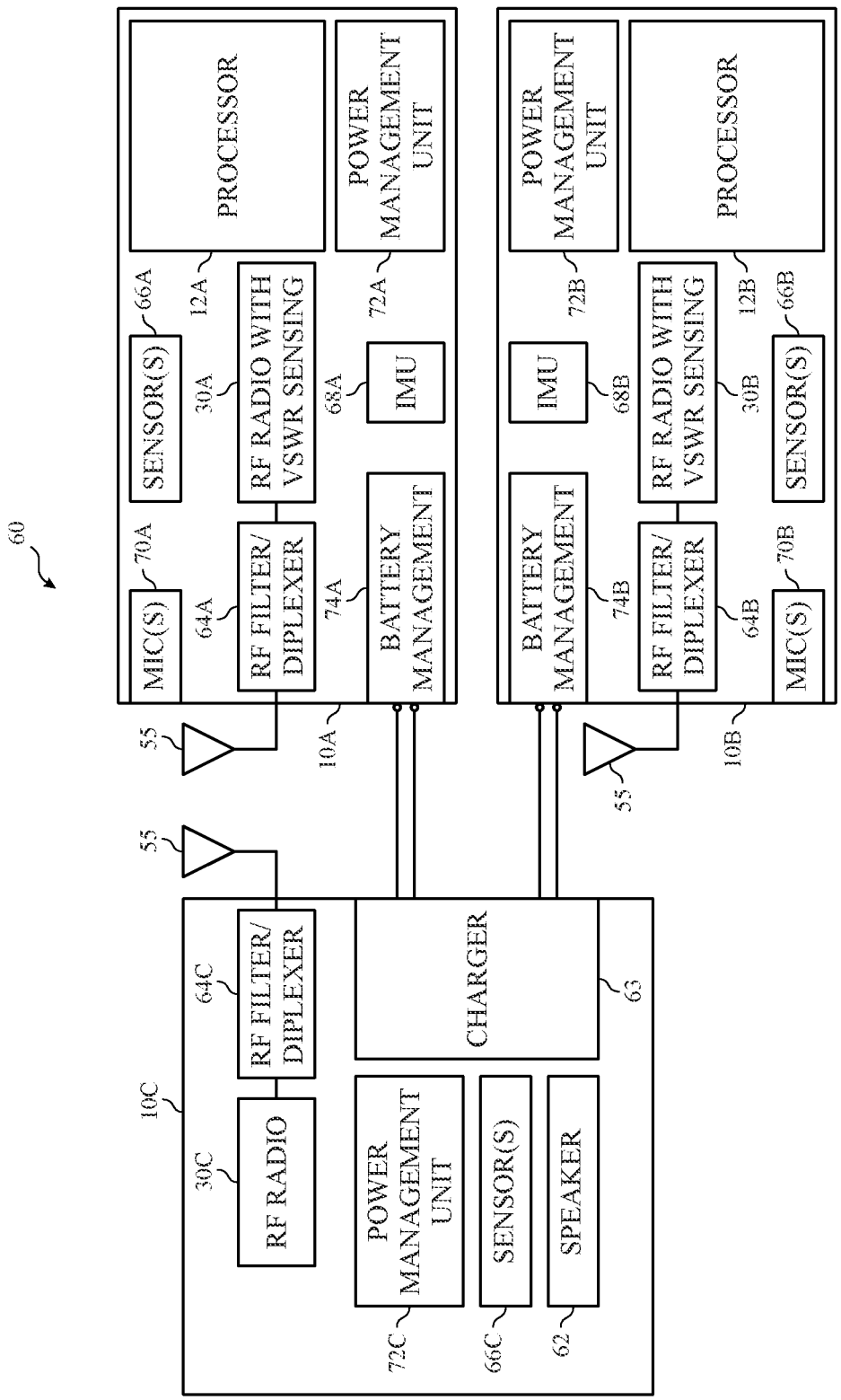
FIG. 3 is a communication system including first and second electronic devices of FIG. 1 (e.g., in the form of earbuds) and a third electronic device of FIG. 1 (e.g., in the form of an enclosure for the earbuds) configured to charge the first and electronic devices, each of the electronic devices having a radio frequency radio, according to embodiments of the present disclosure.

FIG. 3 is a communication system 60 including two of the electronic devices 10a, 10b (e.g., each in the form of an earbud, such as Apple AirPods®) and a third electronic device 10c for the electronic devices 10a, 10b (e.g., in the form of an enclosure for the earbuds 10a, 10b), each of the electronic devices 10a, 10b, 10c (collectively 10) having a radio frequency (RF) radio, according to embodiments of the present disclosure. In particular, the earbuds 10a, 10b may each include an RF radio or transceiver 30a, 30b for communicating with one another and/or with a base, host, or paired device (e.g., which may also be in the form of the electronic device 10, such as a smartphone, a tablet, a laptop, or another computing device). For example, the base device 10 may stream data (e.g., audio signals) to the earbuds 10a, 10b. The enclosure 10c may also include an RF radio or transceiver 30c for communicating with the earbuds 10a, 10b and/or the base device 10. For example, any of the base device 10, the earbuds 10a, 10b, and/or the enclosure 10c may send a signal to other devices 10 among the earbuds 10a, 10b and/or the enclosure 10c to track, locate, or find these other devices 10. The RF radios 30a, 30b, 30c (collectively 30) of these devices 10 may receive the signal, and cause speakers (e.g., 62) of the earbuds 10a, 10b and/or the enclosure 10c to emit an audio signal and/or send a signal in response. The enclosure 10c may enable the earbuds 10a, 10b to be disposed in, on, or near the enclosure 10c to enable charging of a power source 29 (e.g., a battery) of the earbuds 10a, 10b via a charger 63 of the enclosure 10c.

The radios 30 may transmit and/or receive radio frequency signals of different radio frequencies. For example, the radios 30 of the earbuds 10a, 10b and/or the enclosure 10c may include PAN radios (e.g., Bluetooth® radios), WLAN radios (e.g., Wi-Fi radios), and so on. However, concurrent or simultaneous operation of the radios 30 may cause coexistence issues. In some implementations, some communication systems may simply deactivate the radios 30 of the earbuds 10a, 10b or the enclosure 10c when the devices are within a certain proximity of one another. This is because the radios 30 operating concurrently may result in coexistence issues, such as regulatory emissions violations, receiver saturation and desense on any radio 30, and so on. Each radio 30a, 30b, 30c may include a filter and/or diplexer 64a, 64b, 64c (collectively 64) that may remove undesirable noise from an input signal. The filters 64 may include any suitable filter or filters to remove the undesirable noise from the input signal, such as a diplexer, a bandpass filter, a bandstop filter, a low pass filter, a high pass filter, and/or a decimation filter.

Each of the earbuds 10a, 10b may each include one or more sensors 66a, 66b that facilitate determining Voltage Standing Wave Ratio (VSWR) values or measurements for one or more antennas 55 coupled to the RF radio 30a, 30b, determining whether the earbuds 10a, 10b are in an operational configuration (e.g., in an ear or ears of a user) or a non-operational configuration (e.g., not in an ear of the user), determining whether the earbuds 10a, 10b are moving, and so on. For example, the sensors 66a, 66b may include a VSWR sensor having a feedback receiver and a bidirectional coupler. A transmitter 52 of the radio 30a, 30b may transmit a known signal and the feedback receiver may receive or measure the feedback and determine the VSWR value based on a frequency response reflected back from an antenna 55. As another example, the sensors 66a, 66b may include an optical sensor, acoustic sensor, and/or proximity sensor, or the like, that detects whether the earbuds 10a, 10b are in the operational configuration or the non-operational configuration. As yet another example, the sensors 66a, 66b may include an accelerometer, gyroscope, magnetometer, or other motion sensor, to detect or facilitate detecting whether the earbuds 10a, 10b are moving. Additionally or alternatively, each of the earbuds 10a, 10b may include an inertial measurement unit (IMU) 68a, 68b that detects acceleration, orientation, angular rates, and other gravitational forces of the earbuds 10a, 10b. Each of the earbuds 10a, 10b may include one or more microphones 70a, 70b that may detect sounds.

The enclosure device 10c may each include one or more sensors 66a that detect whether the enclosure device 10c is in an accepting or non-accepting (of the earbuds 10a, 10b) configuration. For example, the enclosure device 10c may each include a lid and a sensor 66c, such as a magnet sensor, that may detect whether the lid is in a non-accepting (e.g., closed) or accepting (e.g., open) position.

Embodiments herein provide various systems, apparatuses, and techniques to determine whether to back-off power of one or more radios 30 of the earbuds 10a, 10b or perform other coexistence mitigation procedures based on determining that the earbuds 10a, 10b are disposed in the enclosure 10c. In particular, the processor 12 of the earbuds 10a, 10b may perform the power back-off to avoid coexistence issues (e.g., when signals transmitted and/or received by the radios 30 of the earbuds 10a, 10b and/or the enclosure 10c may violate emission regulations or interfere with one another), such as when the earbuds 10a, 10b are disposed in the enclosure 10c. As such, in certain scenarios, such as when the earbuds 10a, 10b are in use (e.g., disposed in a user's ears) or when the earbuds 10a, 10b are charging in the enclosure 10c, the processor 12 may not need to be determined whether to back-off power of the one or more radios 30a, 30b of the earbuds 10a, 10b. That is, when the earbuds 10a, 10b are in use, it may be unnecessary to determine whether to back-off power of the radios 30a, 30b of the earbuds 10a, 10b, as it is clear that the earbuds 10a, 10b are not disposed in the enclosure 10c, and thus there may not be any coexistence issues. Additionally, when the earbuds 10a, 10b receives an indication of being charged (e.g., by the enclosure 10c), the radios 30a, 30b of the earbuds 10a, 10b may be deactivated, so it is unnecessary to determine whether to back-off power of the radios of the earbuds 10a, 10b as there may not be a coexistence issue.

However, there may be instances in which the earbuds 10a, 10b are disposed in the second enclosure 10c, but do not receive an indication of being charged or receives a delayed indication. For example, when a power source 29 (e.g., a battery) of the earbuds 10a, 10b are drained or has a state of charge under a threshold level, there may be a delay between when the enclosure 10c begins charging the earbuds 10a, 10b, and when the earbuds 10a, 10b receives an indication of charging. Indeed, the earbuds 10a, 10b may receive an indication that charging occurs through its firmware (e.g., firmware of the radios 30 and/or of a system-on-chip (SoC) or processor 12a, 12b of the earbuds 10a, 10b). However, a power management unit (PMU) 72a, 72b of the earbuds 10a, 10b may provide the indication to the firmware, and may only do so when certain capacitors (e.g., coupled to a battery management unit 74a, 74b and/or the PMU 72a, 72b of the earbuds 10a, 10b) are charged (e.g., beyond a threshold level). If the power source 29 of the earbuds 10a, 10b are sufficiently drained, then the earbuds 10a, 10b may only receive the indication of charging through its firmware after the capacitors are charged, and then, only after the charged capacitors activate the PMU 72a, 72b that sends the indication to the firmware. The enclosure 10c may also include a PMU 72c, and the PMUs 72a, 72b 72c (collectively 72) may manage power functions of their respective devices 10a, 10b, 10c. The battery management units 74a, 74b may manage power source 29 or battery functions of their respective devices 10a, 10b.

As such, the processing circuitry 12a, 12b of the earbuds 10a, 10b may more reliably or quickly determine whether the earbuds 10a, 10b are disposed in or being charged by the enclosure 10c based on Voltage Standing Wave Ratio (VSWR) data. If so, then the processing circuitry 12a, 12b may back off power or deactivate the one or more radios 30a, 30b of the earbuds 10a, 10b to avoid coexistence issues between the radios 30 of the earbuds 10a, 10b and the enclosure 10c.

Figure 4:
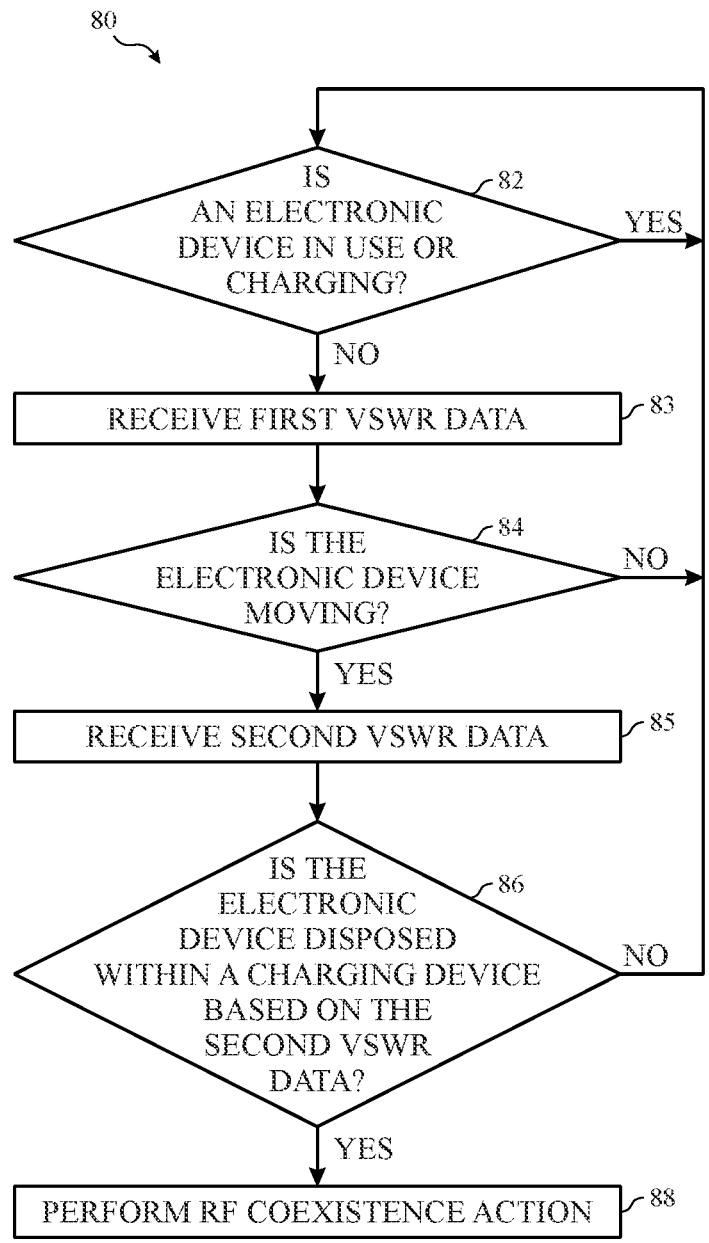
FIG. 4 is a flowchart of a method for determining whether to back-off power of radios of the first electronic device of FIG. 3 or perform other coexistence mitigation procedures based on determining that the earbuds are in the second electronic device, according to embodiments of the present disclosure.

With the foregoing in mind, FIG. 4 is a flowchart of a method 80 for determining whether to back-off power of the radios 30a, 30b of the earbuds 10a, 10b or perform other coexistence mitigation procedures based on determining that the earbuds 10a, 10b are in the enclosure 10c, according to embodiments of the present disclosure. Any suitable device (e.g., a controller) that may control components of the earbuds 10a, 10b and/or the enclosure 10c, such as the processor 12a, 12b, and/or 12c (collectively 12), may perform the method 80. In some embodiments, the method 80 may be implemented by executing instructions stored in a tangible, non-transitory, computer-readable medium, such as the memory 14 or storage 16, using the processor 12. For example, the method 80 may be performed at least in part by one or more software components, such as an operating system of the earbuds 10a, 10b and/or the enclosure 10c, one or more software applications of the earbuds 10a, 10b and/or the enclosure 10c, and the like. Moreover, in some embodiments, the method 80 may be performed at least in part by firmware of the earbuds 10a, 10b and/or the enclosure 10c, such as firmware stored in the radios and/or of the system-on-chip (SoC) or processor 12 of the earbuds 10a, 10b and/or the enclosure 10c. While the method 80 is described using steps in a specific sequence, it should be understood that the present disclosure contemplates that the described steps may be performed in different sequences than the sequence illustrated, and certain described steps may be skipped or not performed altogether.

In process block 82, the processing circuitry 12 (e.g., 12a, 12b) determines whether an electronic device 10 (e.g., the earbuds 10a, 10b) is in use or charging. For example, the processing circuitry 12a, 12b may receive an indication from a sensor 66a, 66b (e.g., an optical sensor and/or proximity sensor) that at least one earbud 10a, 10b is disposed in a user's ear. As another example, the processing circuitry 12a, 12b may receive an indication from the PMUs 72a, 72b and/or the battery management units 74a, 74b that at least one earbud 10a, 10b is charging or not charging. If the processing circuitry 12 determines that the electronic device 10 is in use or charging, then the method 80 returns to and performs process 82.

On the other hand, if the processing circuitry 12 determines that the electronic device 10 is not in use or charging, then, in process block 83, the processing circuitry 12 receives first VSWR data. In particular, the processing circuitry 12 may cause a sensor 66a, 66b (e.g., a VSWR sensor) to acquire VSWR data at a first, slower frequency or rate. While it is possible for the processing circuitry 12 to cause the VSWR sensor 66a, 66b to obtain the VSWR at a faster rate (e.g., such as the second, faster rate discussed below), the slower rate may enable the electronic device 10 to conserve power and/or establish an initial state that, in most instances, represent random impedance depending on how the user is holding the electronic device 10. The first, slower rate may include any suitable rate slower than the second, faster rate of second VSWR data discussed below such that power savings may be achieved, such as an interval of 1 second or greater, 500 milliseconds (ms) or greater, 100 ms or greater, 50 ms or greater, 10 ms or greater, and so on.

In process block 84, the processing circuitry 12 determines whether the electronic device 10 is being moved. For example, if the processing circuitry 12 determines that the first VSWR data corresponds to the electronic device 10 not being in the operational configuration (e.g., not disposed in a user's ear) or not being disposed in a charging device 10 (e.g., the enclosure 10c), then the processing circuitry 12 may determine that the electronic device 10 is moving. In some embodiments, the processing circuitry 12 may determine that the first VSWR data is within a threshold range of a VSWR value when the electronic device 10 was moving taken during, for example, a calibration process. In some embodiments, the electronic device 10 may also use one or more additional sensors 66a, 66b, such as an accelerometer or other motion sensor, acoustic sensor, and so on, to facilitate or confirm that the electronic device 10 is moving. For example, the processing circuitry 12a, 12b may receive an indication from a sensor 66a, 66b (e.g., an accelerometer, gyroscope, magnetometer, or other motion sensor) or the IMUs 68a, 68b that at least one earbud 10a, 10b is being moved. As another example, the earbuds 10a, 10b and the enclosure 10c may perform an acoustic non-audible test sequence to determine whether the earbuds 10a, 10b are moving (e.g., toward the enclosure 10c). If the processing circuitry 12 determines that the electronic device 10 is not moving, then the method 80 returns to and performs process 82.

If the processing circuitry 12 determines that the electronic device 10 is moving, then, in process block 85, the processing circuitry 12 receives second VSWR data. In some embodiments, the processing circuitry 12 may first determine whether the first VSWR data indicates that the electronic device 10 is disposed in the charging device 10. For example, the processing circuitry 12a, 12b may determine whether the first VSWR data is within a threshold range of a VSWR value taken when the electronic device 10 was disposed in the charging device 10 during, for example, a calibration process. In any case, the processing circuitry 12 may cause a sensor 66a, 66b (e.g., a VSWR sensor) to acquire VSWR data at a second, faster frequency or rate (e.g., compared to the first, slower frequency or rate of the first VSWR data). The second, faster rate may facilitate confirming that the electronic device 10 is disposed in the charging device 10. The second, faster rate may include any suitable rate faster than the first, slower rate discussed above such that the first VSWR data or the electronic device 10 being disposed in the charging device 10 may be confirmed, such as an interval of 100 ms or less, 50 ms or less, 10 ms or less, 5 ms or less, 1 ms or less, and so on.

In process block 86, the processing circuitry 12 determines whether the electronic device 10 is disposed in the charging device 10. For example, the processing circuitry 12a, 12b may determine whether the second VSWR data indicates that the electronic device 10 is disposed in the charging device 10 (e.g., is within a threshold range of a VSWR value taken when the electronic device 10 was disposed in the charging device 10 during, for example, a calibration process). If the processing circuitry 12 determines that electronic device 10 is not disposed in the charging device 10, then the method 80 returns to and performs process 82.

If the processing circuitry 12 determines that the electronic device 10 is disposed in the charging device 10, then, in process block 88, the processing circuitry 12 performs an RF coexistence action to decrease or eliminate a likelihood of RF coexistence issues. For example, the processing circuitry 12 may reduce power to the radio 30 of the electronic device 10. In particular, the processing circuitry 12 may reduce power to the radios 30a, 30b of the earbuds 10a, 10b or perform other coexistence mitigation procedures to decrease a likelihood of RF coexistence issues. Additionally or alternatively, the processing circuitry 12 may determine whether the electronic device 10 is charging. For example, the processing circuitry 12a, 12b may receive an indication from the PMUs 72a, 72b and/or the battery management units 74a, 74b that at least one earbud 10a, 10b is charging or not charging. If so, then the processing circuitry 12 may deactivate the radio 30 of the electronic device 10. In particular, the processing circuitry 12 may deactivate the radios 30a, 30b of the earbuds 10a, 10b. This may enable the enclosure 10c to respond if a base or host device 10 transmits an indication to locate the enclosure 10c (or the earbuds 10a, 10b), while the radios of the earbuds 10a, 10b are not in use as the earbuds 10a, 10b are disposed in the enclosure 10c. In this manner, emission regulations may be maintained, receiver saturation or desense of the radios 30 may be reduced or prevented, and other issues that may negatively impact user experience may be avoided.

Figure 5A:
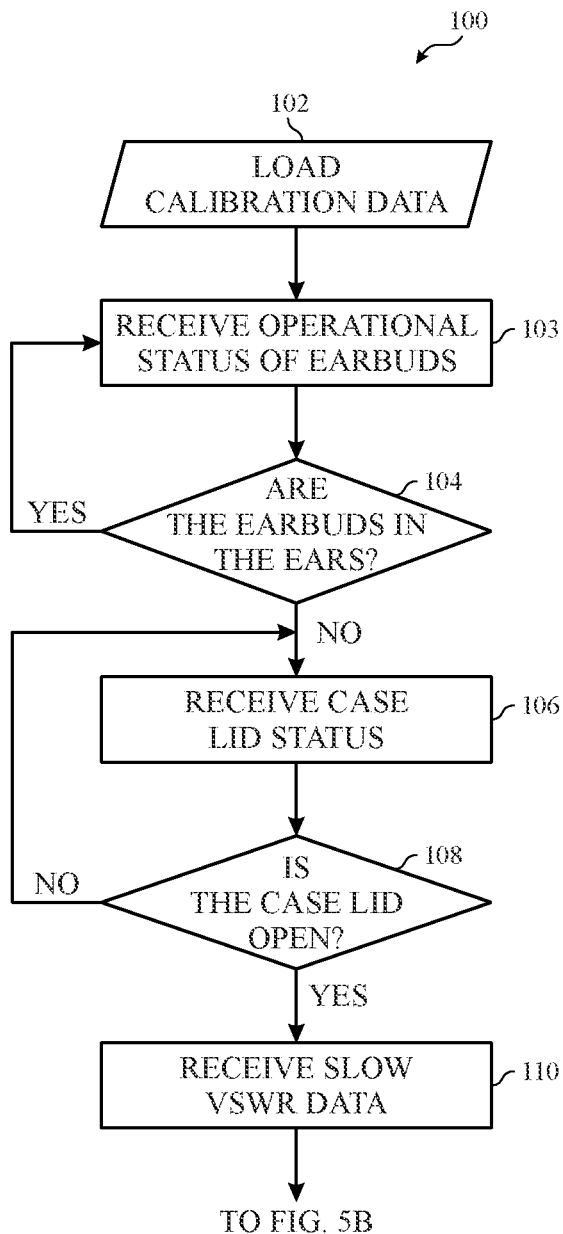
FIGS. 5A and 5B are a flowchart of a method illustrating a use case for determining whether to back-off power of the radios of the first electronic device of FIG. 3 or perform other coexistence mitigation procedures based on determining that the earbuds are in the second electronic device, according to embodiments of the present disclosure.
Figure 5B:
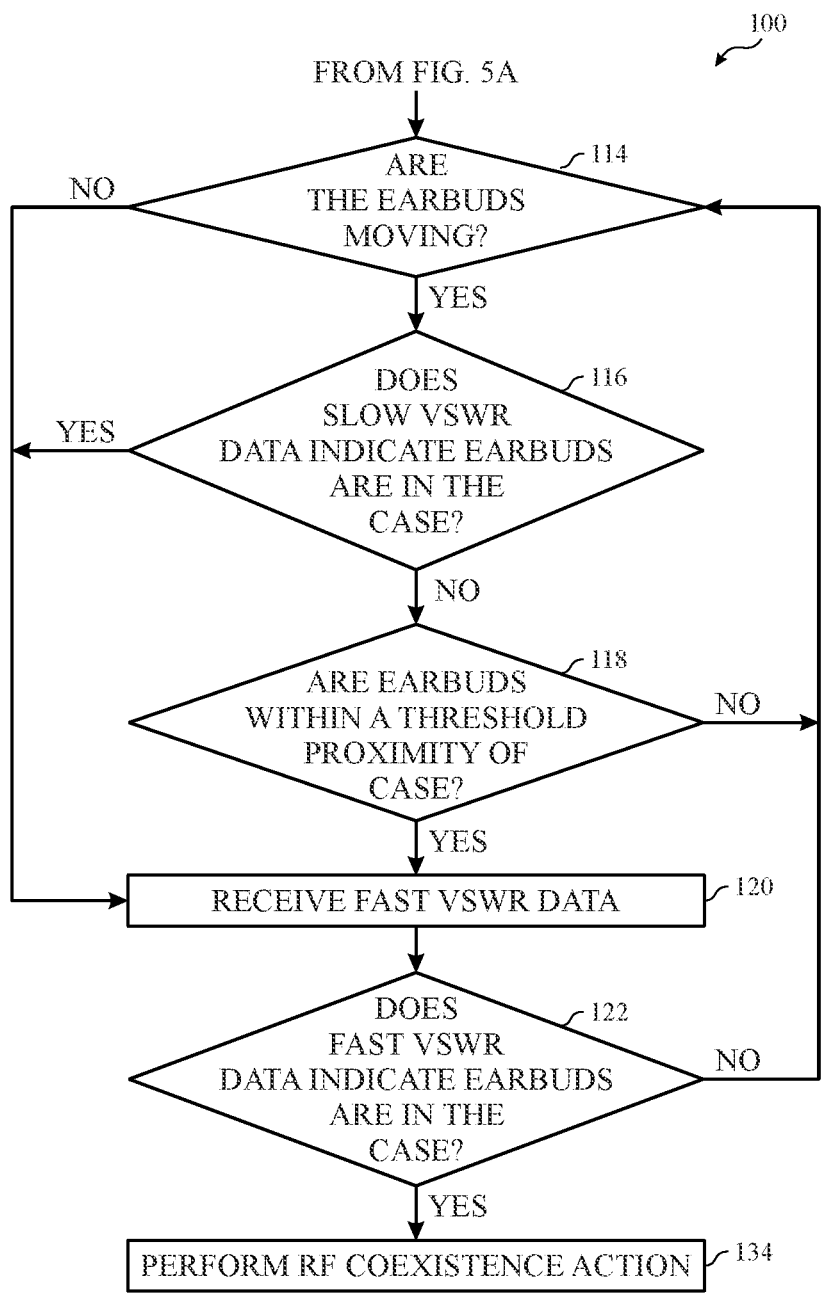

FIGS. 5A and 5B are a flowchart of a method 100 illustrating a use case for determining whether to back-off power of the radios 30a, 30b of the earbuds 10a, 10b or perform other coexistence mitigation procedures based on determining that the earbuds 10a, 10b are in the enclosure 10c, according to embodiments of the present disclosure. Any suitable device (e.g., a controller) that may control components of the earbuds 10a, 10b and/or the enclosure 10c, such as the processor 12a, 12b, and/or 12c (collectively 12), may perform the method 100. In some embodiments, the method 100 may be implemented by executing instructions stored in a tangible, non-transitory, computer-readable medium, such as the memory 14 or storage 16, using the processor 12. For example, the method 100 may be performed at least in part by one or more software components, such as an operating system of the earbuds 10a, 10b and/or the enclosure 10c, one or more software applications of the earbuds 10a, 10b and/or the enclosure 10c, and the like. Moreover, in some embodiments, the method 100 may be performed at least in part by firmware of the earbuds 10a, 10b and/or the enclosure 10c, such as firmware stored in the radios and/or of the system-on-chip (SoC) or processor 12 of the earbuds 10a, 10b and/or the enclosure 10c. While the method 100 is described using steps in a specific sequence, it should be understood that the present disclosure contemplates that the described steps may be performed in different sequences than the sequence illustrated, and certain described steps may be skipped or not performed altogether.

In process block 102, the processing circuitry 12 loads calibration data. The calibration data may include VSWR values that are acquired during a calibration process, corresponding to when the earbuds 10a, 10b are in different operational configurations, statuses, locations, and so on. In particular, the processing circuitry 12 may determine the VSWR values or measurements of the antenna(s) 55 coupled to the transceiver 30a, 30b or the transmitter 52 of the earbuds 10a, 10b in a variety of configurations (e.g., during a calibration process). For example, the processing circuitry 12 and/or the transceiver 30a, 30b may determine the VSWR values while the earbuds 10a, 10b are in a charging configuration (e.g., disposed in the enclosure 10c), while the earbuds 10a, 10b are being held by a user (e.g., in a hand or hands of the user), while earbuds 10a, 10b are in an operational configuration (e.g., in an ear or ears of the user, outputting audio signals), and so on). This is because the VSWR values may differ from user to user (e.g., based on body tissue electrical properties, skin tone, body fat amount, and so on, of each user). These VSWR values may then be used to compare current VSWR values of the earbuds 10a, 10b to determine whether they are disposed in the enclosure 10c. For example, if the current VSWR values are within a threshold range of the VSWR values associated with a configuration of the earbuds 10a, 10b, then the processing circuitry 12 may determine that the earbuds 10a, 10b are in that configuration. The sensors 66a, 66b of the earbuds 10a, 10b may include a VSWR sensor having a feedback receiver and a bidirectional coupler. The transmitter 52 of the transceiver 30a, 30b may transmit a known signal and the feedback receiver may receive or measure the feedback and determine the VSWR value based on a frequency response reflected back from an antenna 55.

In process block 103, the processing circuitry 12 receives an operational status of the earbuds 10a, 10b. That is, the operational status of the earbuds 10a, 10b may include whether the earbuds 10a, 10b are in an operational configuration (e.g., in an ear or ears of the user) or not. In particular, the sensors 66a, 66b may include an optical sensor, acoustic sensor, and/or proximity sensor, or the like, that detects whether the earbuds 10a, 10b are in the operational configuration or the non-operational configuration.

In decision block 104, the processing circuitry 12 determines whether the earbuds 10a, 10b are in the operational configuration (e.g., in an ear or ears of the user). For example, the processing circuitry 12 may use one or more sensors 66a, 66b, such as an optical sensor, an acoustic sensor, and/or a proximity sensor of the earbuds 10a, 10b to determine whether the earbuds 10a, 10b are in the operational configuration. If so, then the method 100 returns to and performs process block 103. In some embodiments, the processing circuitry 12 may wait a delay period (e.g., any suitable delay period, including between 10 seconds or more, 30 seconds or more, 60 seconds or more, and so on) using, for example, a timer, or for a trigger condition (e.g., a change in operational status of the earbuds 10a, 10b) prior to returning to and performing process block 103.

If the earbuds 10a, 10b are not in the operational configuration, then, in process block 106, the processing circuitry 12 receives a case lid status or an accepting configuration of the enclosure 10c or case. For example, the enclosure 10c may include a lid, and a sensor 66c, such as a magnet sensor, that may detect whether the lid is in an open or closed position. The enclosure 10c may charge the earbuds 10a, 10b when the earbuds 10a, 10b are disposed in the enclosure 10c. The enclosure 10c may transmit an indication, via its radio 30c, to the earbuds 10a, 10b whether the lid is in the open position (e.g., in an accepting configuration to accept the earbuds 10a, 10b) or in the closed position (e.g., in a non-accepting configuration indicating it may not accept the earbuds 10a, 10b). An indication that the enclosure 10c is in the accepting (e.g., the lid is in the open position) may indicate that the earbuds 10a, 10b may be placed into the enclosure 10c for charging. In process block 108, the processing circuitry 12 determines whether the case lid is open. If not, then the enclosure 10c is in the non-accepting configuration, and the method 100 returns to and performs process block 106.

If the processing circuitry 12 determines that the case lid is open (e.g., the enclosure 10c is in the accepting configuration), then, in process block 110, the processing circuitry 12 receives slow VSWR data. In particular, the processing circuitry 12 may cause a sensor 66a, 66b (e.g., a VSWR sensor) to acquire VSWR data (e.g., a series of VSWR values or measurements) at a first, slower frequency or rate. While it is possible for the processing circuitry 12 to cause the VSWR sensor 66a, 66b to obtain the VSWR at a faster rate (e.g., such as the second, faster rate of the fast VSWR data discussed below), the slower rate may enable the earbuds 10a, 10b to conserve power and/or establish an initial state that, in most instances, represent random impedance depending on how the user is holding the earbuds 10a, 10b. The first, slower rate may include any suitable rate slower than the second, faster rate discussed below such that power savings may be achieved, such as an interval of 1 second or greater, 500 milliseconds (ms) or greater, 100 ms or greater, 50 ms or greater, 10 ms or greater, and so on.

In process block 114, the processing circuitry 12 determines whether the earbuds 10a, 10b are moving. In some embodiments, the processing circuitry 12 may use the slow VSWR data to determine if the earbuds 10a, 10b are not in the operational configuration (e.g., in an ear or ears of the user) nor in the enclosure 10c, such as when the earbuds 10a, 10b are in the open air, held in the user's hand, resting on a table, and so on. For example, if the slow VSWR data is within a threshold range of a VSWR value when the earbuds 10a, 10b were not in the operational configuration nor in the enclosure 10c taken during, for example, a calibration process, then the processing circuitry 12 may determine that the earbuds 10a, 10b are moving (e.g., between the operational configuration and the enclosure 10c).

In additional or alternative embodiments, the processing circuitry 12 may use additional sensors to determine or facilitate determining whether the earbuds 10a, 10b are moving. For example, the processing circuitry may use motion sensor data from an accelerometer 66a, 66b, another motion sensor, or the IMUs 68a, 68b to determine or facilitate determining whether the earbuds 10a, 10b are moving. As another example, the processing circuitry 12 may initiate or perform an acoustic non-audible test sequence. For example, the enclosure 10c may include a speaker 62 that emits a series of non-audible (e.g., so as not to hamper user experience) acoustic signals that may be detected by a microphone 70a, 70b of the earbuds 10a, 10b, and the processing circuitry 12 may determine whether the earbuds 10a, 10b are moving based on the microphone 70a, 70b detecting the acoustic signals of the speaker 62.

If the processing circuitry 12 determines that the earbuds 10a, 10b are moving, then, in decision block 116, the processing circuitry 12 determines whether the slow VSWR data indicate that the earbuds 10a, 10b are in the enclosure 10c. For example, the processing circuitry 12 may determine whether the slow VSWR data corresponds to the earbuds 10a, 10b being disposed in the enclosure 10c. For example, if the slow VSWR data is within a threshold range of a VSWR value when the earbuds 10a, 10b were disposed in the enclosure 10c taken during, for example, a calibration process, then the processing circuitry 12 may determine that the earbuds 10a, 10b are disposed in the enclosure 10c. Otherwise, the processing circuitry 12 may determine that the earbuds 10a, 10b are not disposed in the enclosure 10c.

In decision block 118, the processing circuitry 12 determines whether the earbuds 10a, 10b are within a threshold proximity of the enclosure 10c. The threshold proximity may be any suitable distance that would indicate that the earbuds 10a, 10b may be placed into the enclosure 10c for charging. For example, the threshold proximity may be within 1 meter or less, 2 meters or less, 3 meters or less, 4 meters or less, 5 meters or less, 10 meters or less, and so on. In some embodiments, the processing circuitry 12 may receive or determine the proximity of the earbuds 10a, 10b to the enclosure 10c from or based on a sensor 66a, 66b (e.g., proximity sensor, optical sensor, motion sensor, and so on) or radio 30a, 30b of the earbuds 10a, 10b. In additional or alternative embodiments, the microphones 70a, 70b of the earbuds 10a, 10b may receive the acoustic non-audible test sequence, and the processing circuitry 12 may determine whether the earbuds 10a, 10b are within the threshold proximity of the enclosure 10c based on a signal characteristic (e.g., volume, signal strength, RSSI, RSRP, or the like) of the series of signals. In another example, the earbuds 10a, 10b may determine a location of the enclosure 10c (e.g., using radiolocation), and determine whether the earbuds 10a, 10b are within a threshold proximity of the enclosure 10c, as indicated by its motion sensor 66a, 66b. In yet another example, an RF signal communication sequence (e.g., a Bluetooth® advertising sequence) between the earbuds 10a, 10b and the enclosure 10c may be used to determine whether the earbuds 10a, 10b are within a threshold proximity of the enclosure 10c. If the processing circuitry 12 determines that the earbuds 10a, 10b are not within the threshold proximity of the enclosure 10c, then the method 100 returns to and performs process block 114.

On the other hand, if the processing circuitry 12 determines that the earbuds 10a, 10b are within the threshold proximity of the enclosure 10c, or if the slow VSWR data from decision block 116 indicates that the earbuds 10a, 10b are disposed in the enclosure 10c, then, in process block 120, the processing circuitry 12 receives fast VSWR data (e.g., a series of VSWR values or measurements that facilitate confirming that the earbuds 10a, 10b are disposed in the enclosure 10c). In particular, the processing circuitry 12 may cause a sensor 66a, 66b (e.g., a VSWR sensor) to acquire VSWR data at a second, faster frequency or rate compared to that of the slower frequency or rate of the first VSWR data. This faster rate may help ensure or confirm that the earbuds 10a, 10b are disposed in the enclosure 10c, as more VSWR data or measurements are taken in a smaller duration of time, which the processing circuitry 12 may compare to VSWR data corresponding to the earbuds 10a, 10b being disposed in the enclosure 10c. The second, faster rate may include any suitable rate faster than the first, slower rate discussed above such that the slow VSWR data or the earbuds 10a, 10b being disposed in the enclosure 10c may be confirmed, such as an interval of 100 ms or less, 50 ms or less, 10 ms or less, 5 ms or less, 1 ms or less, and so on.

In process block 122, the processing circuitry 12 determines whether the fast VSWR data indicates that the earbuds 10a, 10b are in the enclosure 10c. For example, the processing circuitry 12 may determine whether the fast VSWR data corresponds to the earbuds 10a, 10b being disposed in the enclosure 10c. That is, the processing circuitry 12 may determine whether the fast VSWR data is within a threshold range of a VSWR value taken when the earbuds 10a, 10b were disposed in the enclosure 10c. If the processing circuitry 12 determines that the fast VSWR data does not indicate that the earbuds 10a, 10b are in the enclosure 10c, then the method 100 returns to and performs process block 114.

On the other hand, if the fast VSWR data indicates that the earbuds 10a, 10b are disposed in the enclosure 10c (e.g., is within a threshold range of a VSWR value taken when the earbuds 10a, 10b were disposed in the enclosure 10c), then, in process block 134, the processing circuitry 12 performs an RF coexistence action to avoid coexistence issues between the radios 30 of the earbuds 10a, 10b and the enclosure 10c. For example, the processing circuitry 12 may back off or reduces power to the radios 30a, 30b of the earbuds 10a, 10b and/or perform other coexistence mitigation procedures. The other coexistence mitigation procedures may include backing off power to or deactivating any of the transmitters 52 and/or receivers 54 of the earbuds 10a, 10b and/or the enclosure 10c, reducing or ceasing signal traffic on the transmitters 52 and/or receivers 54 of the earbuds 10a, 10b and/or the enclosure 10c, deactivating or turning off the radios 30a, 30b of the earbuds 10a, 10b, or any other suitable action that reduces or avoids RF coexistence issues between the earbuds 10a, 10b and/or the enclosure 10c. In this manner, emission regulations may be maintained, receiver saturation or desense of the radios may be reduced or prevented, and other issues that may negatively impact user experience may be avoided.

In additional or alternative embodiments, the sensors 66a, 66b (e.g., the motion sensor) of the earbuds 10a, 10b may be leveraged to interrupt or replace acquiring the VSWR values, in case a VSWR value may not be converged or obtained in a target duration (e.g., to avoid draining the power source 29). That is, sensor data may be used in place of the VSWR values to determine whether the earbuds 10a, 10b are moving, disposed within or outside of the enclosure 10c, and so on. Moreover, the sensors 66a, 66b (e.g., the motion sensor) of the earbuds 10a, 10b may be used as a trigger or enhancement to enable high resolution (e.g., faster rate) VSWR values to converge to a deterministic state. Further, the earbuds 10a, 10b may receive a secondary signal from the enclosure 10c to re-affirm the accuracy of the VSWR values, which may change over time due to aging of the devices. This may be used to update or adjust the stored VSWR values to continuously improve accuracy of the VSWR values that trigger the RF coexistence actions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
receiving, via processing circuitry of an electronic device, an indication that the electronic device is moving;
receiving, via the processing circuitry, a Voltage Standing Wave Ratio (VSWR) value for one or more antennas of the electronic device; and
performing, via the processing circuitry, a radio frequency coexistence action based on the VSWR value.

2. The method of claim 1, wherein the indication is an additional VSWR value for the one or more antennas of the electronic device.

3. The method of claim 1, comprising receiving a second indication that the electronic device is moving.

4. The method of claim 3, wherein the second indication is received from a motion sensor of the electronic device.

5. The method of claim 3, wherein the second indication is received based on an acoustic sequence performed between the electronic device and a second electronic device.

6. The method of claim 3, wherein the second indication is received based on a signal characteristic or signal communication sequence between the electronic device and a second electronic device.

7. The method of claim 1, wherein the radio frequency coexistence action comprises reducing power of a transceiver of the electronic device coupled to the one or more antennas.

8. An electronic device comprising:
one or more antennas;
a transceiver coupled to the one or more antennas; and
processing circuitry coupled to the transceiver, the processing circuitry configured to
receive an indication that the electronic device is not in use,
receive a Voltage Standing Wave Ratio (VSWR) value for the one or more antennas, and
perform a radio frequency coexistence action based on the VSWR value.

9. The electronic device of claim 8, comprising earbuds.

10. The electronic device of claim 8, comprising an optical sensor configured to transmit the indication that the electronic device is not in use, and determine that the electronic device is not in use when not disposed in a user's ear.

11. The electronic device of claim 8, wherein the processing circuitry is configured to receive a first series of VSWR values at a first rate and compare the first series of VSWR values to a calibrated VSWR value corresponding to the electronic device being disposed in a second electronic device.

12. The electronic device of claim 11, wherein the processing circuitry is configured to determine a second series of VSWR values at a second rate based on the first series of VSWR values being within a first threshold range of the calibrated VSWR value.

13. The electronic device of claim 12, wherein the first rate is less than the second rate.

14. The electronic device of claim 13, wherein the processing circuitry is configured to determine that the electronic device is in a predetermined position relative to the second electronic device based on the VSWR value being with a threshold of a calibrated VSWR value.

15. One or more non-transitory, tangible, computer-readable media, storing instructions configured to cause processing circuitry of a first electronic device to:
receive, via a transceiver of the first electronic device, an indication of a status of a second electronic device;
receive a Voltage Standing Wave Ratio (VSWR) value for one or more antennas of the first electronic device coupled to the transceiver based on the status; and
perform a radio frequency coexistence action based on the VSWR value.

16. The one or more non-transitory, tangible, computer-readable media of claim 15, wherein the second electronic device comprises a lid, and the status corresponds to the lid being open.

17. The one or more non-transitory, tangible, computer-readable media of claim 16, wherein the second electronic device comprises a magnet sensor configured to determine that the lid is open.

18. The one or more non-transitory, tangible, computer-readable media of claim 16, wherein the instructions are configured to cause the processing circuitry to receive the VSWR value based on the lid being open.

19. The one or more non-transitory, tangible, computer-readable media of claim 18, wherein the radio frequency coexistence action comprises deactivating the transceiver.

20. The one or more non-transitory, tangible, computer-readable media of claim 15, wherein the second electronic device comprises an enclosure for the first electronic device.

* * * * *